US008631425B2

(12) United States Patent
Videlov (10) Patent No.: US 8,631,425 B2
(45) Date of Patent: Jan. 14, 2014

(54) METHOD FOR PROCESSING OF APPLICATION TRANSACTION IN A WEB SERVICES FRAMEWORK

(75) Inventor: Vladimir E. Videlov, Sofia (BG)

(73) Assignee: SAP AG, Walldorf (DE)

( * ) Notice: Subject to any disclaimer, the term of this patent is extended or adjusted under 35 U.S.C. 154(b) by 1571 days.

(21) Appl. No.: 11/749,701

(22) Filed: May 16, 2007

(65) Prior Publication Data

US 2008/0288956 A1   Nov. 20, 2008

(51) Int. Cl.
  *G06F 9/06*   (2006.01)
(52) U.S. Cl.
  USPC ........... 719/330; 719/313; 707/610; 707/648; 707/683; 707/684
(58) Field of Classification Search
  None
  See application file for complete search history.

(56) References Cited

U.S. PATENT DOCUMENTS

| 7,028,187 | B1 * | 4/2006 | Rosen ........................... 713/175 |
| 7,720,992 | B2   | 5/2010 | Brendle et al. |
| 2005/0015643 | A1 * | 1/2005 | Davis et al. ...................... 714/4 |
| 2006/0080670 | A1 * | 4/2006 | Lomet ........................... 719/314 |
| 2006/0123119 | A1 * | 6/2006 | Hill et al. ...................... 709/227 |
| 2006/0129650 | A1 * | 6/2006 | Ho et al. ........................ 709/207 |
| 2006/0171405 | A1 * | 8/2006 | Brendle et al. ................ 370/412 |

OTHER PUBLICATIONS

Web Services Reliable Messaging TC WS-Reliable 1.1, Nov. 15, 2004, Oasis, Kazunori Iwasa.*

* cited by examiner

*Primary Examiner* — H S Sough
*Assistant Examiner* — Syed Roni
(74) *Attorney, Agent, or Firm* — Blakely, Sokoloff, Taylor & Zafman (57) ABSTRACT

A system and method are provided to perform tentative updating for transactions using the Web Services Reliable Messaging protocol. From a protocol layer of a client side web services framework persists a message from an application transaction (a reversion message) in a persistent storage unit. The web services framework forwards the reversion message as a reliable message to a transport layer to cause a recipient to revert to a state prior to the application transaction, if a triggering event occurs in the web services framework. If no triggering event occurs a confirmation message is forwarded as a reliable message to confirm receipt of the tentative update at the transport layer. Concurrently with the confirmation persisted reversion message is deleted from the persistent storage unit.

16 Claims, 6 Drawing Sheets

METHOD FOR PROCESSING OF APPLICATION TRANSACTION IN A WEB SERVICES FRAMEWORK

BACKGROUND

1. Field

This invention relates to processing of messages in a web services framework, and more particularly to a method and a system for processing an application transaction in a web services system.

2. Background

A web service is a software application to support interoperable machine to machine interaction over a network. The term "web service" is to be understood as a technology that allows software applications to communicate with each other and can be used to engage in business relationships (e.g., buying and selling) in a partially or wholly automated fashion over a public network such as the Internet. Standards bodies and interoperability organizations that have contributed to the web services effort include the World Wide Web Consortium (W3C), the Organization for the Advancement of Structured Information Standards (OASIS), the Internet Engineering Task Force (IETF) and the web services Interoperability Organization (WS-I).

The web services architecture as an instance of a typical Service Oriented Architecture (SOA) includes two types of web service applications: a web service provider and a web service consumer. The web service provider is the provider of one or more web services that can be accessed over the network and the web service consumer is generally understood to be an entity that seeks and (in cases where a suitable web service is found) uses a particular web service through a network. The web service provider could be also a web service consumer. The communication between the web service provider and the web service consumer in the web services architecture is implemented through an exchange of Simple Object Access Protocol (SOAP) text messages written in eXtensible Markup Language (XML).

Because the web services architecture is an interoperability architecture it identifies those global elements of the global web services network that are required to ensure interoperability between web services using standards and specifications to achieve the interoperability. The existing most common specifications are related to, for example Web Services Reliable Messaging Protocol (WS-Reliable Messaging), SOAP and etc.

SOAP message usually contains an envelope that further contains a header (which may be optional) and a body. The header is typically used to pass "control" information associated with the consumer's web service engagement with the web service provider. The body is used to pass "business" information from the web service consumer to the web service provider. The header of SOAP message may be extended with various information to achieve some additional needs of customers depending on the business relationships in the web services.

A web services framework provides a structure for integration and a foundation for protocols that will support the needs (describing, discovering and exchanging information) of web service applications. Depending on whether the web services framework is implemented on the web service provider or on the web service consumer, the web services framework could be recognized as a client side web services framework that is responsible for sending a web services request to a web services provider or a provider web services framework that is responsible for responding to the web services request. The web services request and the web services response are SOAP messages. The web services framework for processing a web services message is actually a web services runtime framework, implemented in object-oriented software and may be written in Java programming language. The web services runtime framework includes a runtime object that essentially behaves as a manager for the overall process. The runtime object calls upon, at appropriate instances, various other object-oriented structures to fully process a message. On the client side web services framework these various object-oriented structures include: 1) data that describes the applicable web service; 2) information specific to the particular process run being executed, referred to as a configuration context; 3) a protocol chain that contains the object-oriented program code for processing message header information; 4) a transport protocol to convey a message in its transportable format.

The configuration context contains all data for the current processing web services request including the SOAP message. On the client side web services framework there may be additional software that invokes the use of the web service through a proxy for the web service. The proxy is essentially a part of on integrated application that is downloaded to a remote location so that the remote location can call upon methods local to itself that pertain to the application.

Typically, the protocol chain in a web services framework includes several protocols. The protocols with similar functions are usually structured together in an abstraction layer of protocols. In a typical web services framework there are several abstraction layers of protocols. For example, one abstraction layer of protocols within the web services framework is a protocol layer that is responsible for managing, for example, a Web Services Security protocol (WS-Security); a Web Services Reliable Messaging protocol (WS-ReliableMessaging); Web Services Addressing protocol (WS-Addressing), etc. During message processing, protocols usually add to the SOAP message header extension information. This extension information could be implemented in various combinations to effect a broad spectrum of different business relationship models that the web services system can support.

The transport protocol can handle various transport protocols (e.g., HyperText Transfer Protocol Secure (HTTPS), Simple Mail Transfer Protocol (SMTP), etc.) to communicate between the web service consumer and the web service provider at a transport layer.

The WS-ReliableMessaging protocol as a standard protocol at the protocol layer is responsible to ensure the transactions between the two web services across the network. The transaction may be disrupted including messages being lost, corrupted, duplicated, and/or received out-of-order. These disruptions still need to be handled effectively and efficiently in web services systems. A standard Web Services Reliable Message Protocol specification has been authored to fulfill these needs and serves as a building block for varying web services implementations.

Processing of standard WS-ReliableMessaging is handled by the web services framework, in an interoperable and optimized way. Additionally other web services may use capabilities like Reliable Messaging, Addressing, Security or others. All protocols are called by the web services runtime framework in a linear order for each web services request, response or fault SOAP message and may amend the header of SOAP message during its processing. The order of protocol invocation is different depending on where it is used: on the client or on the provider side.

Web services rely on a collection of technologies, standards and specifications, though more new standards are currently being defined to enrich the potential of the web services platform. Enterprise computing system often use web services as a way to distribute information, and many more systems use web services to conduct business processes that require application transaction capability.

Generally an application transaction is a sequence of messages from an application on the web services consumer (a consumer application) to an application on the web services provider (a provider application). Usually at the application level there is logic to ensure that data is protected from accidental modifications that would invalidate it. If a triggering event occurs that upsets the tentative sequence of changes, all the previous changes can be undone to restore the database to its original form. Unfortunately existing web services reliable message protocol fails to support tentative updates for reliable messaging transactions.

SUMMARY OF THE INVENTION

A system and method of performing tentative updating for transactions using the WS-ReliableMessaging protocol is disclosed. From a protocol layer of a client side web services framework persists a message from an application transaction (a reversion message) in a persistent storage unit. The web services framework forwards the reversion message as a reliable message to a transport layer to cause a recipient to revert to a state prior to the application transaction, if a triggering event occurs in the web services framework. If no triggering event occurs a confirmation message is forwarded as a reliable message to confirm receipt of the tentative update at the transport layer. Concurrently with the confirmation the persisted reversion message is deleted from the persistent storage unit.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
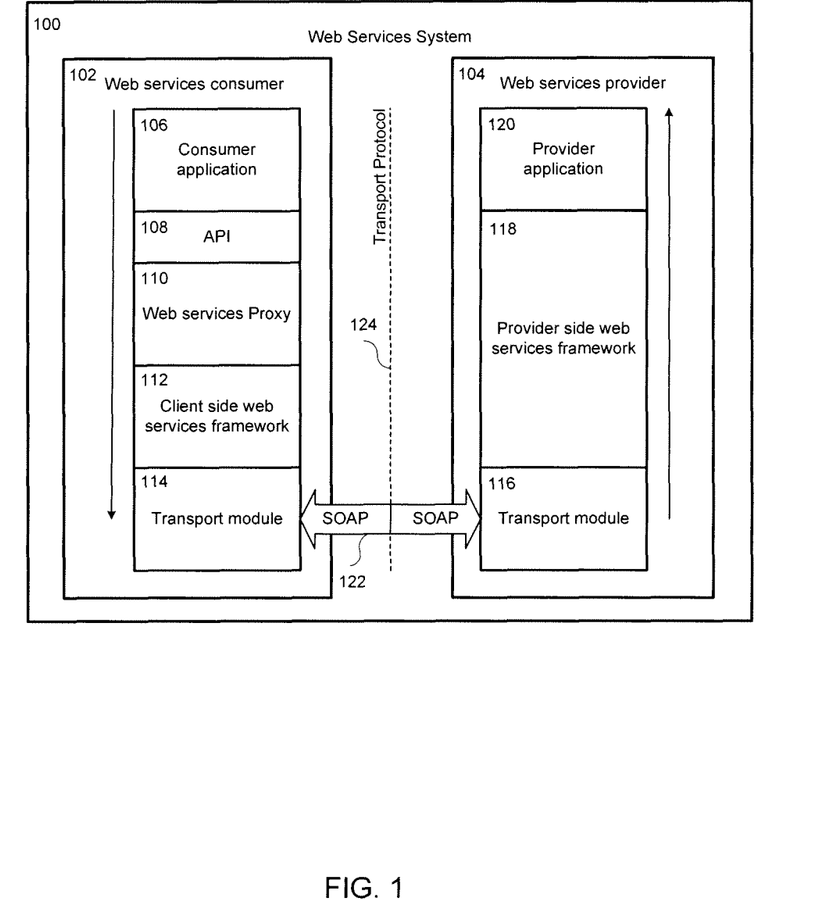
FIG. 1 is a block diagram of a web services system according to an implementation of the invention.

FIG. 1 is a block diagram of a web services system according to an implementation of the invention. The Web Services System (WS System) 100 includes a web services consumer (WS consumer) 102 to send a web services request. The WS System also includes a web services provider (WS provider) 104 to receive the web services request from the WS consumer 102 and to respond to the web services request. According to an implementation of the invention both the WS consumer 102 and the WS provider 104 are configured to a particular web service configuration to permit consistent processing of the application transaction between the consumer 102 and provider 106. In the WS consumer 102, a consumer application 106 sends a message to the client side web services framework 112.

In one embodiment, the WS consumer 102 builds a configuration context and loads a set of protocols based on the web services client configuration. The configuration context and protocols are used to process the application transaction at a runtime. The configuration context contains all data for the current processing web services message including a SOAP message. The WS consumer 102 also includes an Application Programming Interface (API) 108. The API 108 is a set of interfaces with which a web consumer application communicates with the implementation components. A flag in the configuration context may be set through the API 108 to indicate the type of the message in the application transaction. In some embodiments, the WS consumer 102 may include a web services proxy 110. In some embodiments, the web services proxy 110 prepares and runs the web services client runtime framework.

The client side web services framework 112 provides a structure for a foundation for protocols that supports processing of the message from the application transaction according to the web services configuration. The client side web services framework 112 identifies at the protocol layer the type of the message by checking a flag in the configuration context. Based on the flag, the message from the application transaction may be determinable, for example, a reversion message, a confirmation message or any other message, e.g., a tentative update. A transport module 114 is used to transmit the SOAP message 122 to the WS provider 104 using a specific concrete transport protocol binding such as HTTP. The transmitted information from the WS consumer to the WS provider is an application transaction. Some of the SOAP messages of the transmitted application transaction may perform a modification of the application data on the WS provider. For example the tentative update may be a database transformation on the WS provider side.

The SOAP message 122 is received by the WS provider 104 where a transport module 116 in the WS provider is capable of receiving SOAP messages over the transport protocol 124, e.g. HTTP.

The provider side web services framework 118 recognizes and processes the SOAP message amended in the client side web services framework. The protocols in the protocol chain at the protocol layer on the provider side web services framework 118 are executed in a reverse order compared to the execution of the protocols on the client web services side.

The provider application 120 has logic to perform (commit) or revert (rollback) the received tentative update, therefore the web services provider may perform the sequence of tentative updates if the confirmation message is received by the web services provider or revert to the state prior to the application transaction if the reversion message is received.

Figure 2:
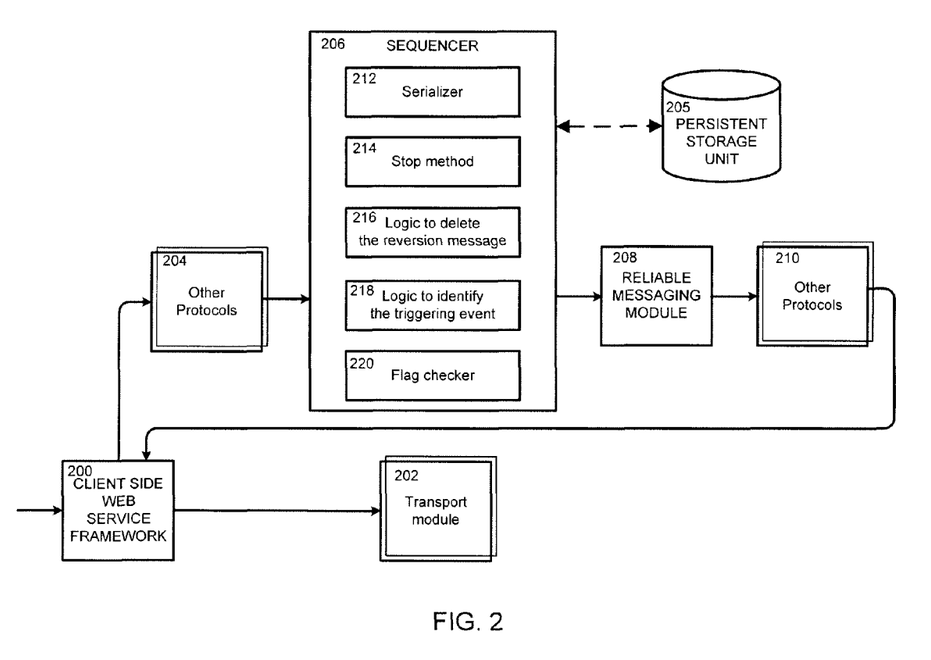
FIG. 2 is a simplified block diagram of an application transaction processing in a protocol layer and a transport layer of a client side web service framework with an expanded view of the sequencer according to an implementation of the invention.

FIG. 2 is a simplified block diagram of an application transaction processing in a protocol layer and a transport layer of a client side web services framework 200 with an expanded view of a sequencer 206, according to an implementation of the invention. The arrows represent the SOAP messages processing at the protocol layer of the client side web services framework and forwarding the SOAP messages to the transport layer.

The web services configuration of the client side web services framework contains a set of protocols to be invoked in exact order according to the web services configuration.

There are several protocols that may be coupled to the client side web service framework 200 at the protocol layer. Some protocols 204 may be coupled before the sequencer 206 to process the SOAP message. The sequencer 206 is coupled to the client side web services framework at the protocol layer upstream relative to a reliable messaging module 208. Some other protocols may be coupled to the client side web service framework 200 further along the protocol chain after the reliable messaging module 208, e.g. WS-Addressing protocol.

The sequencer 206 is responsible for persisting the binary data related with the reversion message of an application transaction in a persistent storage unit 205, for example the persistent storage unit could be a database.

The sequencer 206 includes a serializer 212 to serialize the configuration context containing the reversion message into binary data. In this case "serialization" is the well-known process of saving an object to a sequence of bytes referred to as binary data.

The sequencer 206 also includes logic to identify a triggering event 218. If a triggering event occurs in the client side web services framework then the logic 218 causes a restart of the client side web services framework and a reversion to a state prior to the application transaction on the web services recipient.

The sequencer 206 includes a flag checker 220 that identifies the outgoing message of the WS consumer as one of a reversion message or a confirmation message in the application transaction according to the flag in the configuration context. In case the flag checker identifies the outgoing message as a reversion message the stop method 214 prevents further processing of the reversion message and the sequencer 206 does not forward the reversion message to the reliable messaging module 208.

If the flag checker 220 identifies the outgoing message as a confirmation message then logic to delete the reversion message 216 as a part of the sequencer 206 deletes the reversion message from the persistent storage unit 205.

The sequencer 206 forwards either the reversion message or the confirmation message to the reliable messaging module 208 at a reliable messaging protocol layer. The reliable messaging module amends the SOAP message to add reliable message data to the header of the SOAP message and provides the amended SOAP message to a transport module 202 at the transport layer.

The transport module 202 is coupled to the client side web services framework on the transport layer. The transport module 202 formats the SOAP message for transmission over the network.

Figure 3:
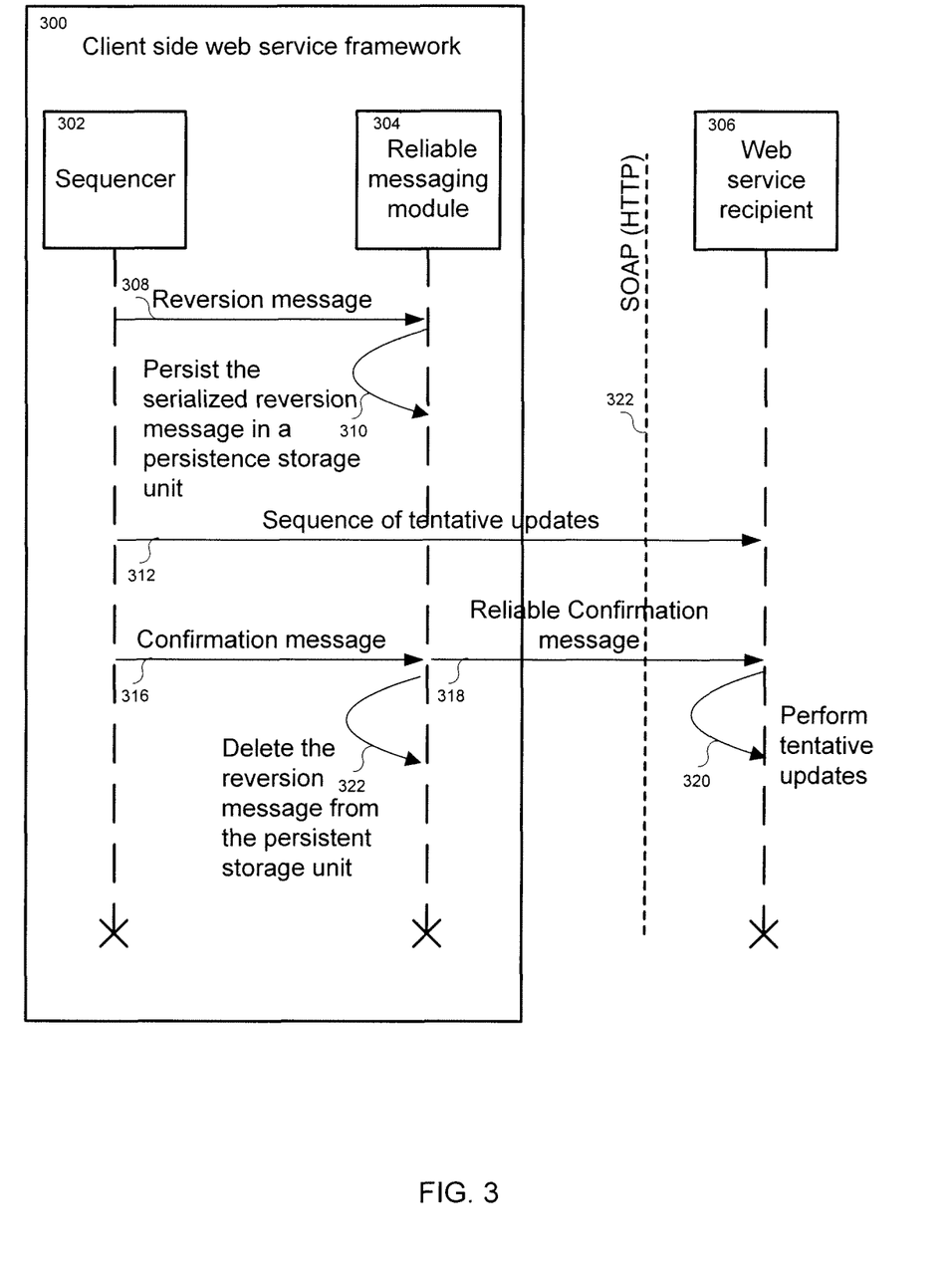
FIG. 3 is a diagram of outgoing message processing according to an implementation of the invention.

FIG. 3 is a diagram of outgoing message processing according to an implementation of the invention. The sequencer 302 within client side web services framework 300 prevents processing of the reversion message 308 from the reliable messaging module 304. The sequencer 302 persists the reversion message in a persistent storage unit. In one embodiment, to persist the reversion message the sequencer 302 first serializes the configuration context containing the reversion message into a serialized reversion message and stores the serialized reversion message in the persistent storage unit 310, e.g. a database.

The client side web services framework 300 transmits a sequence of tentative updates from the application update transaction 312 to a web services recipient 306 at the transport level using a transport protocol, e.g. HTTP 322. The web services recipient 306 may be a WS provider.

In a normal situation when no triggering event occurs in the client side web services framework 300, the web services recipient 306 receives the whole transmitted sequence of tentative updates from the application update transaction 312 and the sequencer 302 passes a confirmation message 316 to the reliable messaging module 304 as a SOAP message. The reliable messaging module 306 amends the SOAP message by adding reliable message data to the header of the SOAP message and provides the amended SOAP message to the transport layer as a reliable confirmation message 318 to be transmitted to the web services recipient 306. When the reliable confirmation message 318 is received, the sequence of tentative updates if performed (320) by the web services recipient 306 and the sequencer 302 deletes the persisted reversion message from the persistent storage unit (322).

Figure 4:
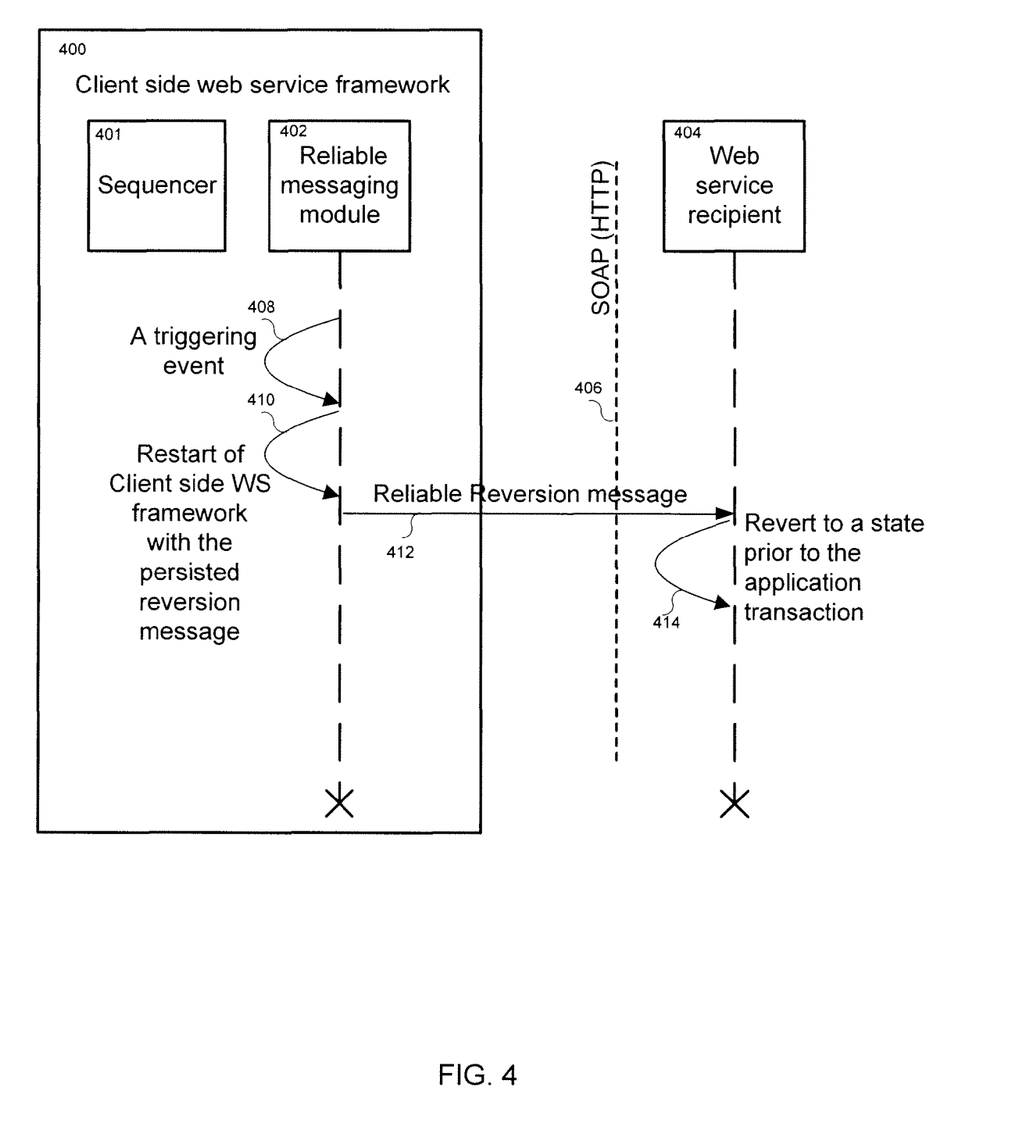
FIG. 4 is a diagram of outgoing message processing if a triggering event occurs in a client side web services framework according to an implementation of the invention.

FIG. 4 is a diagram of outgoing message processing if a triggering event occurs in a client side web services framework 400 according to an implementation of the invention. If a triggering event 408 occurs in the client side web services framework 400 the sequencer 401 restarts the client side web services framework (410) using the persisted reversion message from the persistent storage unit. In one embodiment, the triggering event may be the absence of receipt of a confirmation message prior to a system restart or, put slightly differently, the existence of a stored reversion message at restart of the system. The sequencer 401 deserializes the persisted reversion message from the binary data and creates a runtime object from the configuration context. The sequencer then restarts the client side services framework 400 with the new runtime object.

The reliable messaging module 402 amends the SOAP message by adding reliable message data to the header of the SOAP message and provides the amended SOAP message to the transport layer as a reliable reversion message 412 to be transmitted to the web services recipient 404. The reliable reversion message 412 causes the web services recipient 404 to revert to the state prior to the application transaction 414.

Figure 5:
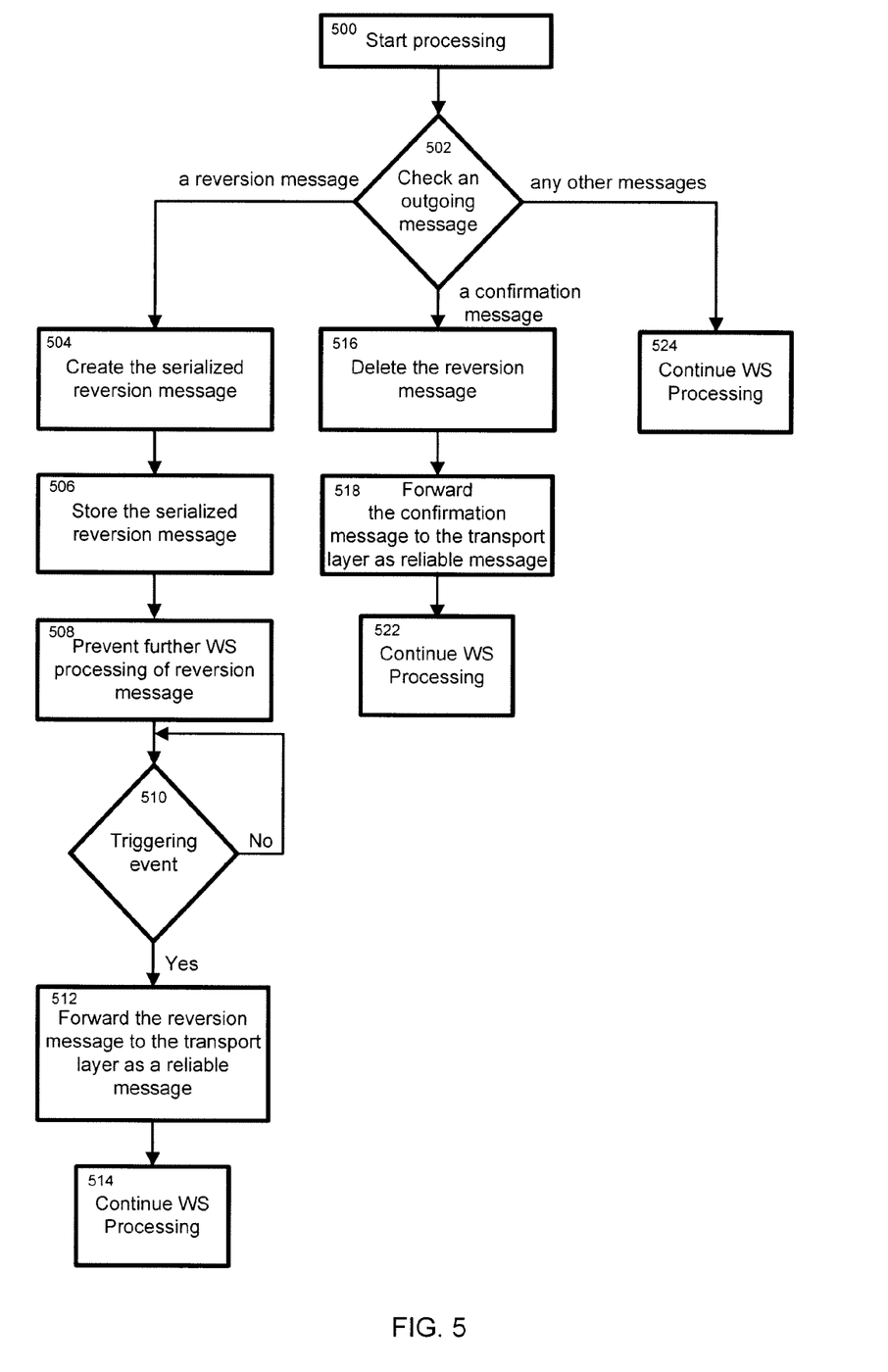
FIG. 5 is a flow chart illustrating a method of processing of an outgoing message in a client side web services framework according to an implementation of the invention.

FIG. 5 is a flow chart illustrating a method of processing of an outgoing message in a client side web services framework according to an implementation of the invention. The processing of the outgoing message starts at block 500. A flag checker from the sequencer checks the flag in the configuration context of the outgoing message (block 502). If the outgoing message is identified as a reversion message then the configuration context containing the reversion message is converted to binary data and a serialized reversion message is created (block 504). The serialized reversion message is stored in a persistent storage unit (block 506). The serialized reversion message may be used to resume processing of the particular message at a later point in time. The further processing of the reversion message at the protocol layer stops (block 508). If a triggering event is identified in the client side web services framework (block 510), the reversion message is resumed and forwarded to the transport layer as a reliable message at block 512 and the web services processing continues at block 514.

If the outgoing message is identified as a confirmation message (block 502) then the stored reversion message is deleted from the persistent storage unit (block 516), the confirmation message is forwarded to the transport layer as a reliable message (block 518) to confirm the sequence of tentative updates. The web services processing continues at block 522. If the outgoing message is not identified as a reversion message or a confirmation message the web services processing continue at block 524.

Figure 6:
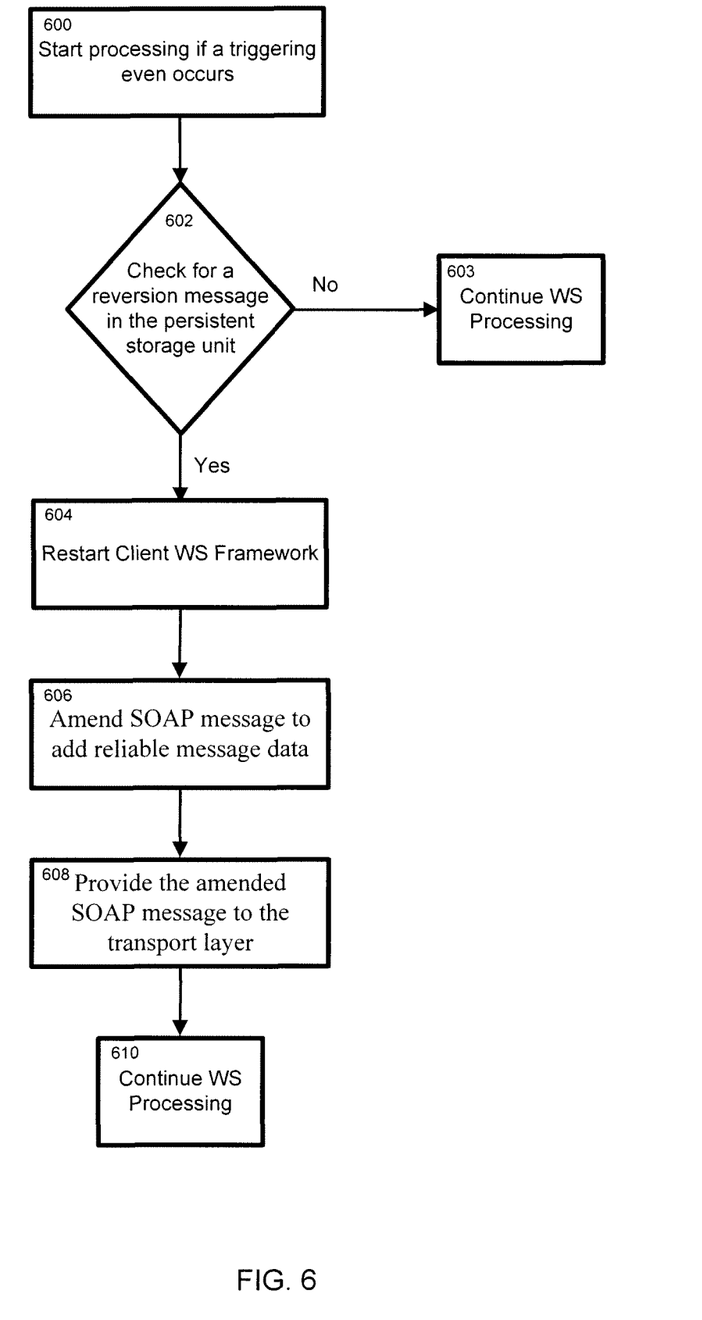
FIG. 6 is a flow chart illustrating a method of processing of an outgoing message in a client side web services framework if a triggering event occurs according to an implementation of the invention.

FIG. 6 is a flow chart illustrating a method of processing of an outgoing message in a client side web services framework if a triggering event occurs according to an implementation of the invention. The reliable messaging module coupled to the sequencer is responsible for forwarding either the reversion message or the confirmation message to the transport layer. The processing of the outgoing message if a triggering event occurs starts at block 600. The sequencer checks the persistent storage unit for the presence of a reversion message at block 602. If no reversion message is present, processing continues at block 603. If a reversion message is present in the persistent storage unit, the web services framework deserializes the reversion message and restarts (block 604) the web services framework. The reversion message is then forwarded to the reliable message module and amended to add reliable messaging data at block 606. The reliable reversion message is provided to the transport layer at block 608. Web service processing continues at block 610. In one embodiment, a triggering event is startup of the web services framework.

In other embodiment of the invention, it is possible a web services system to process more than one application transaction at the same time. If a triggering event occurs in the client side web services framework more than one reversion message may be persisted in the persistent storage unit. The stored reversion messages are processed, according the above described method in first in first out order. The first stored reversion message will be the first reversion message to be process by the web services framework and will be deleted from the persistent storage unit. Then the next persisted reversion messages will be processed sequentially in the order of their persisting until the last reversion message has been processed.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
executing, from a protocol layer of a client side web service framework, a process to determine whether a recipient is to receive a message, including:
persisting a reversion message in a memory, the reversion message associated with a client side application transaction processed on the client side and requiring updates to the recipient, and including a configuration context for the client side application and a command to cause the recipient to delete uncommitted update messages related to the client side application transaction;
preventing the reversion message from being forwarded to the recipient until a triggering event occurs, wherein the triggering event comprises a startup or restart of the client side web service framework while the reversion message is stored in the memory;
deleting the reversion message from the memory so that the recipient is prevented from receiving the reversion message associated with the client side application transaction if a confirmation message confirming completion of the client side application transaction is received at the protocol layer, and forwarding the confirmation message to the recipient, the recipient to commit updates of the uncommitted update messages related to the client side application transaction upon receipt of the confirmation message; and
forwarding the reversion message and a runtime object created from the configuration context to the recipient via a transport layer as a reliable message if the triggering event occurs, the recipient to execute the runtime object to delete and not commit the updates of the uncommitted update messages related to the client side application transaction upon receipt of the reversion message.

2. The method of claim 1 further comprising:
identifying, at the protocol layer of the client side web service framework, whether an outgoing message of the client side application transaction is a reversion message or a confirmation message by checking a flag in the configuration context.

3. The method of claim 1 further comprising:
forwarding any received confirmation message to the transport layer as a reliable message.

4. The method of claim 1 wherein the protocol layer of the client side web service framework comprises a reliable messaging protocol layer and forwarding the reversion message comprises:
passing the reversion message to the reliable messaging protocol layer as a Simple Object Access Protocol (SOAP) message;
amending the SOAP message to add reliable message data to a header of the SOAP message; and
providing the amended SOAP message to the transport layer.

5. The method of claim 1 wherein persisting the revision reversion message in the memory comprises:
serializing the configuration context containing the reversion message to create a serialized reversion message; and
storing the serialized reversion message in a database included in the memory.

6. The method of claim 1 further comprising:
identifying the triggering event as a restart of the client side web service framework prior to receipt of the confirmation message.

7. A system comprising:
a web services client including a memory to process a web services client application transaction;
a web services provider to store updates related to the web services client application transaction upon receipt of a confirmation message, to commit the updates related to a web services client application transaction upon receipt of a confirmation message, and to execute a runtime object to delete the updates related to the web services client application transaction upon receipt of a reversion message;
a web services framework to receive update messages from the application of the web services client;
a sequencer coupled to the web services framework and the web services provider, the sequencer to persist a reversion message from the web services client to the web services provider in the memory and prevent the reversion message from being forwarded to the web services provider until a triggering event occurs, wherein the triggering event comprises a startup or restart of the web services framework while the reversion message is stored in the memory, the reversion message associated with a processed web services client application transaction and to include a configuration context for the web services client application and a command to cause the web services provider to revert to a state prior to the web services client application transaction, wherein the sequencer includes logic to delete the reversion message upon receipt of a confirmation message from the web service client confirming completion of the web services client application transaction so that the web services provider is prevented from receiving the reversion message, and forward the confirmation message and the runtime object created from the configuration context to the web services provider; and
a reliable messaging module coupled to the sequencer to pass the reversion message as a reliable message to the web services provider via a transport layer in response to the triggering event.

8. The system of claim 7 wherein the memory includes a database to retain the reversion message received from the sequencer.

9. The system of claim 7 wherein the sequencer comprises:
a serializer to convert the configuration context containing the reversion message to binary data; and
a stop method to prevent further processing of the reversion message by the web services framework.

10. The system of claim 7 wherein the sequencer is coupled upstream relative to the reliable messaging module.

11. The system of claim 7 wherein the sequencer further comprises:
a flag checker to identify an outgoing message as one of the reversion message or a confirmation message for the web services client application transaction according to a flag in the configuration context.

12. A machine readable non-transitory storage medium having instructions therein that when executed by the machine causes the machine to:
execute, from a protocol layer of a client side web service framework, a process to determine whether a recipient is to receive a message, including:
persist a reversion message in a memory, the reversion message associated with a client side application transaction processed on the client side and requiring updates to the recipient, and including a configuration context for the client side application and a command to cause the recipient to delete uncommitted update messages related to the client side application transaction;
prevent the reversion message from being forwarded to the recipient until a triggering event occurs, wherein the triggering event comprises a startup or restart of the client side web service framework while the reversion message is stored in the memory;
delete the reversion message from the memory so that the recipient is prevented from receiving the reversion message associated with the client side application transaction if a confirmation message confirming completion of the client side application transaction is received at the protocol layer, and forwarding the confirmation message to the recipient, the recipient to commit updates of the uncommitted update messages related to the client side application transaction upon receipt of the confirmation message; and
forward the reversion message and a runtime object created from the configuration context to the recipient via a transport layer as a reliable message if the triggering event occurs, the recipient to execute the runtime object to delete and not commit the updates of the uncommitted update messages related to the client side application transaction upon receipt of the reversion message.

13. The machine readable non-transitory storage medium of claim 12 having instruction that when executed further cause the machine to:
identify, at the protocol layer of the client side web service framework, whether an outgoing message of the client side application transaction is a reversion message or a confirmation message by checking a flag in the configuration context.

14. The machine readable non-transitory storage medium of claim 12 having instruction that when executed further cause the machine to:
forward any received confirmation message to the transport layer as a reliable message.

15. The machine readable non-transitory storage medium of claim 12 wherein the protocol layer of the client side web service framework comprises a reliable messaging protocol layer and instructions causing the machine to forward the reversion message comprise instructions causing the machine to:
pass the reversion message to the reliable messaging protocol layer as a Simple Object Access Protocol (SOAP) message;
amend the SOAP message to add reliable message data to a header of the SOAP message; and
provide the amended SOAP message to the transport layer.

16. The machine readable non-transitory storage medium of claim 12 wherein instructions causing the machine to persist the revision message in the memory comprise instructions causing the machine to:
serialize the configuration context containing the reversion message to create a serialized reversion message; and
store the serialized reversion message in a database in the memory.

* * * * *